US006866028B2

United States Patent
Mahakul et al.

(10) Patent No.: US 6,866,028 B2
(45) Date of Patent: Mar. 15, 2005

(54) EMISSION REDUCTION KIT FOR EMD DIESEL ENGINES

(75) Inventors: Budhadeb Mahakul, Naperville, IL (US); Verne E. Rezabek, La Grange Park, IL (US); Rafiqul Islam, Naperville, IL (US); Frank M. Graczyk, Darien, IL (US); Chih L. Liu, Naperville, IL (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/727,351

(22) Filed: Dec. 3, 2003

(65) Prior Publication Data

US 2004/0144091 A1 Jul. 29, 2004

Related U.S. Application Data

(60) Provisional application No. 60/434,860, filed on Dec. 19, 2002.

(51) Int. Cl.[7] ........................... F02M 61/08; F02B 29/04
(52) U.S. Cl. ...................... 123/501; 60/599; 123/193.6; 123/563
(58) Field of Search .............................. 123/193.6, 446, 123/501, 502, 563; 60/599; 239/88, 533.2

(56) References Cited

U.S. PATENT DOCUMENTS

| 4,028,892 | A | * | 6/1977 | Hinkle | 60/599 |
| 4,258,550 | A | * | 3/1981 | Hinkle et al. | 60/599 |
| 4,429,738 | A | * | 2/1984 | Woodhull, Jr. | 165/151 |
| 5,467,924 | A | * | 11/1995 | Buescher et al. | 239/88 |
| 5,564,390 | A | * | 10/1996 | Houtz et al. | 123/357 |
| 5,791,316 | A | * | 8/1998 | Houtz et al. | 123/357 |
| 6,227,179 | B1 | * | 5/2001 | Eiermann et al. | 123/563 |
| 6,318,308 | B1 | * | 11/2001 | Hsu et al. | 123/48 A |
| 6,349,706 | B1 | * | 2/2002 | Hsu et al. | 123/500 |
| 6,491,237 | B1 | * | 12/2002 | Coppola et al. | 239/533.2 |

* cited by examiner

Primary Examiner—Tony M. Argenbright
(74) Attorney, Agent, or Firm—Cary W. Brooks

(57) ABSTRACT

Engine reconfiguration kits are developed for NOx emission reduction in Electro-Motive Division of General Motors Corporation model 645 diesel engines. The kits feature improved unit fuel injectors providing better fuel atomization with retarded injection timing and other improvements. Included new higher efficiency four pass counterflow aftercoolers provide reduced airbox inlet air temperatures. New connector pipes for the counterflow aftercoolers may also be included. Optional higher compression ratio pistons are available for increased fuel efficiency in some engine types. The kits reduce NOx emissions without increasing smoke, CO or particulate emissions or reducing performance.

8 Claims, 4 Drawing Sheets

EMISSION REDUCTION KIT FOR EMD DIESEL ENGINES

CROSS-REFERENCE TO RELATED APPLICATION

This application claims the benefit of U.S. Provisional Application No. 60/434,860 filed Dec. 19, 2002.

TECHNICAL FIELD

This invention relates to Electro-Motive Division (EMD) of General Motors Corporation model 645 two-cycle diesel engines and, more particularly, to emission reduction kits for such engines.

BACKGROUND OF THE INVENTION

In response to a United States Environmental Protection Agency requirement, EMD has developed a family of kits including components to be substituted for the corresponding components originally provided with various types of 645 model engines in order to meet a requirement for reduced emission of nitrogen oxides (NOx). It is known that NOx emissions can be reduced by retarding fuel injection timing. However, this generally leads to an increase in smoke, CO and particulate emissions. It is also known that reducing engine airbox temperature contributes to lower NOx emissions. Previously, the 645 model engines had used two pass parallel flow aftercoolers. However, improved four pass counterflow aftercoolers were known to provide reduced airbox temperatures.

SUMMARY OF THE INVENTION

In order to meet the EPA requirements, approximately two dozen separate kits have been developed containing replacement components for model 645FB, 645E3B and EC3 and 645E3 engines, as well as 645E and 645E-SW engines.

In general, the E-SW switcher models required only changes in the injectors to meet the requirements. The 645E models required new injectors and a replacement oil separator element. For the remaining models, the kits all included substantially improved unit fuel injectors and four pass counterflow aftercoolers replacing the original components.

A basic feature of the kits is inclusion of a pin stack-low sac injector nozzle designed by Interstate-McBee to timing retard specifications provided by EMD. The following commonly assigned United States patents cover various features of these injectors: U.S. Pat. No. 6,321,723B1 issued Nov. 27, 2001; U.S. Pat. No. 6,012,433 issued Jan. 11, 2000; U.S. Pat. No. 6,007,000 issued Dec. 28, 1999; U.S. Pat. No. 5,797,427 issued Aug. 25, 1998; U.S. Pat. No. 5,725,157 issued Mar. 10, 1998 and U.S. Pat. No. 5,467,924 issued Nov. 21, 1995. The disclosures of all these issued patents are incorporated by reference in this application.

Additional basic features of the kits are higher efficiency four pass counterflow aftercoolers which replace the two pass parallel flow aftercoolers of the previous model 645 engines. The number of fins in the aftercooler cores has also been increased to provide better cooling efficiency. The new aftercoolers are effective to lower airbox temperatures by approximately 20% and NOx emissions by about 7% compared to the original aftercoolers. The kits also include revised pipes for connecting new aftercoolers into the engine cooling system.

For the E3B type engines, an alternate fuel package is also available which includes, in addition to the injectors and counterflow aftercoolers, higher compression ratio pistons. These increase the cylinder compression ratio from about 14.5 to about 16 to 1. This package provides improved fuel efficiency for the engines while continuing to meet the requirements of the new regulations.

These and other features and advantages of the invention will be more fully understood from the following description of certain specific embodiments of the invention taken together with the accompanying drawings.

DESCRIPTION OF THE PREFERRED EMBODIMENT

Figure 1:
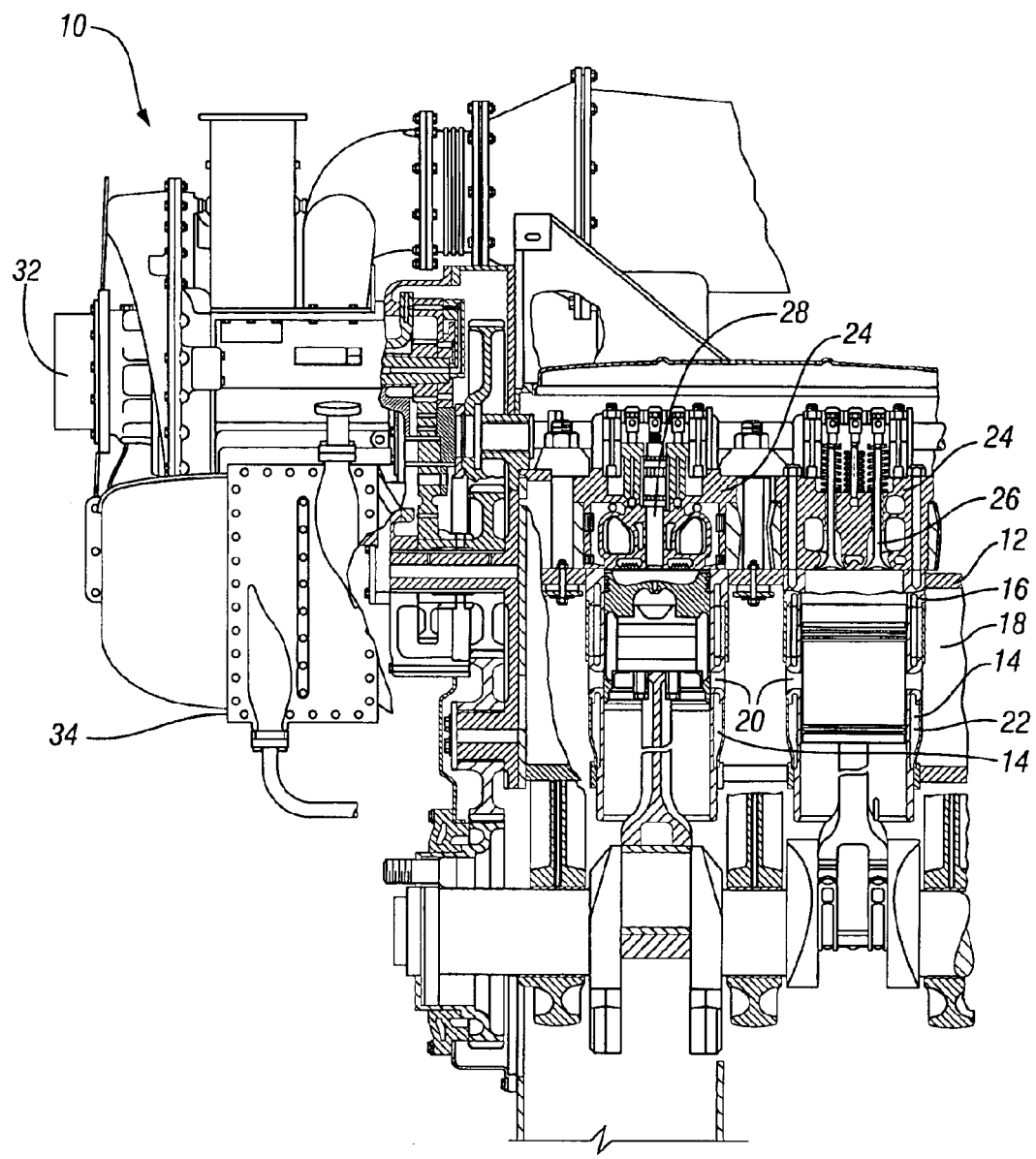
FIG. 1 is a fragmentary cross-sectional view of a prior art EMD model 645 engine showing the left bank aftercooler and a cylinder unit injector.
Figure 2:
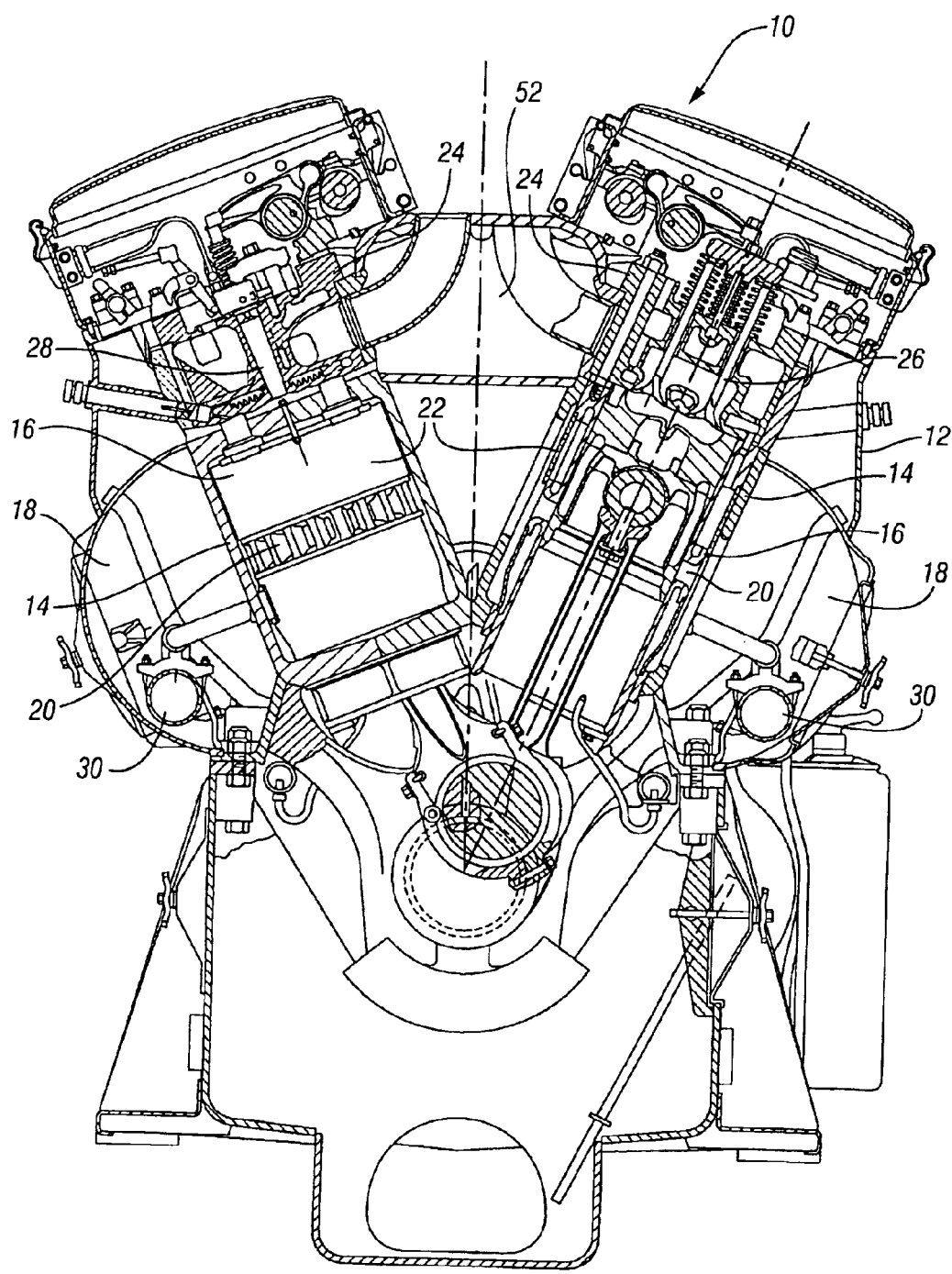
FIG. 2 is a transverse cross-sectional view of the engine of FIG. 1.

Referring first to FIGS. 1 and 2 of the drawings, numeral 10 generally indicates an EMD model 645 two cycle diesel engine. Engine 10 includes a crankcase 12 including two banks 14 of longitudinally aligned cylinders 16. The crankcase 12 further defines right and left bank airboxes 18 which are pressurized to provide scavenging and charging air to the cylinders 16 through ports 20 formed in cylinder liners 22. Individual cylinder heads 24 are fixed to the tops of the liners 22 and include exhaust valves 26 for controlling the exhaust of combustion products from the cylinders. Each head also carries a fuel injector 28 for injecting diesel fuel into the cylinders in accordance with a predetermined injection timing setting.

The injectors are mechanically actuated unit injectors wherein a plunger actuated by a camshaft and rocker arm is reciprocated to inject fuel at a predetermined timing setting. The volume of fuel injected each stroke and the time of injection is controlled by a helix on the plunger which is rotated by a mechanically actuated rack to control the proper amount and timing of the fuel injected at each piston stroke. Further details of the operation of the injectors and their various features are described in the previously mentioned United States patents, which have been incorporated herein by reference.

The engine has a cooling system 29, which includes coolant manifolds 30 extending longitudinally through each of the airboxes 18. The coolant manifolds are connected to the cylinder liners for providing coolant for cooling the engine cylinders during operation. External radiators, not shown, cool the heated coolant, which is pumped through the manifolds 30 by engine mounted water pumps, not shown.

As shown in FIG. 1, the engine also includes a turbocharger 32 mounted on the engine crankcase and driven in part by a mechanical gear train and by engine exhaust gases. The turbocharger 32 delivers pressurized air to the engine airboxes 18 for scavenging and charging the cylinders.

Between the turbocharger compressor outlets, not shown, and each of the engine airboxes 18, there is mounted an aftercooler 34, one for each bank of cylinders. The aftercoolers 34 are connected with the coolant manifolds 30, which provide the aftercoolers with cooling water for cooling the inlet air delivered to the engine airboxes from the turbocharger.

Figure 3:
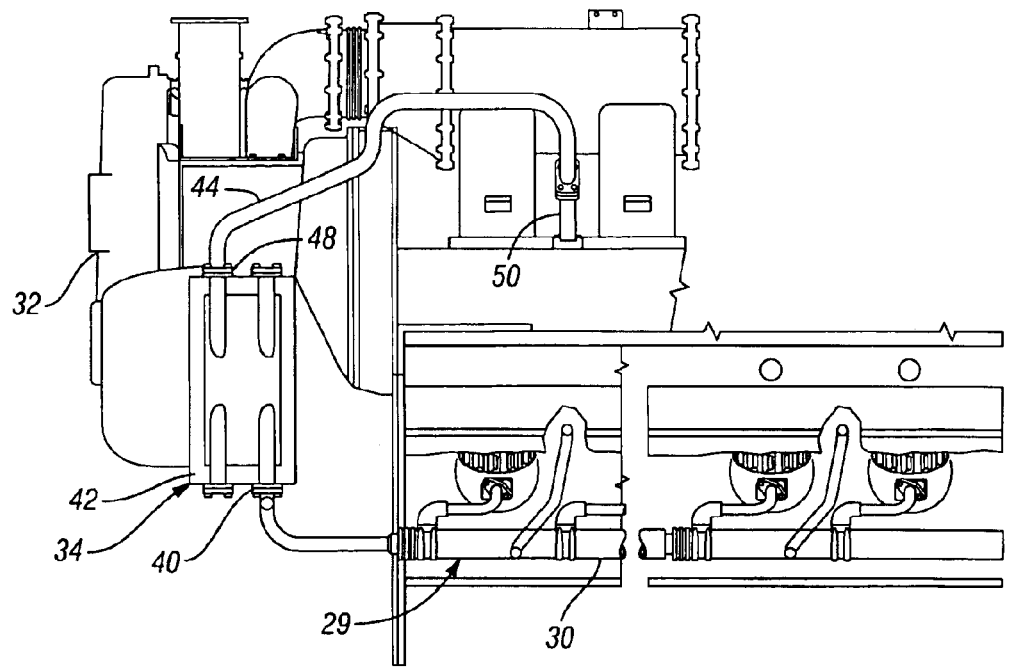
FIG. 3 is a side view showing connections of the right bank aftercooler to the engine cooling system.
Figure 4:
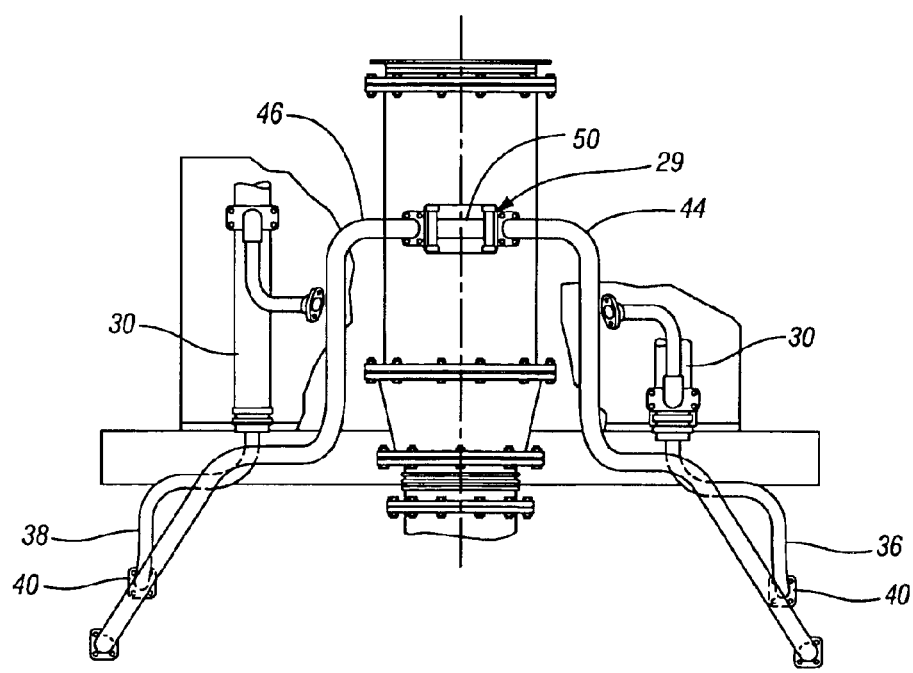
FIG. 4 is a top view of the aftercooler pipe connections.
Figure 5:
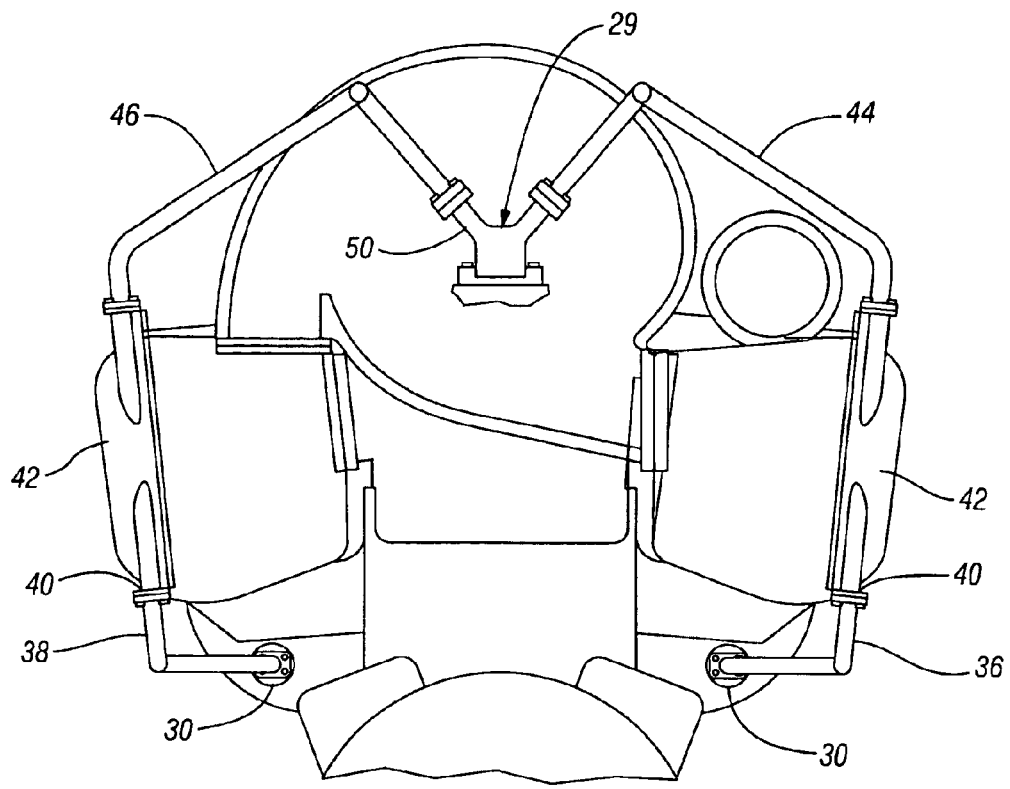
FIG. 5 is an end view of the aftercooler pipe connections.

Referring next to FIGS. 3–5, there are shown respectively side, top and end views of the portions of the engine cooling system which connect with the aftercoolers 34. At the rear face of the engine crankcase, right and left bank feed pipes 36, 38 are connected between the coolant manifolds 30 and inlet ports 40, located at the bottom of each manifold header 42 and offset toward the engine side of the respective aftercooler 34. At upper ends of the headers 42, return pipes 44, 46 are connected between an outlet port 48 at the end of each header farthest from the engine to a return connector 50 that returns cooling water to a coolant gallery 52 in the crankcase between the engine cylinder banks.

Figure 6:
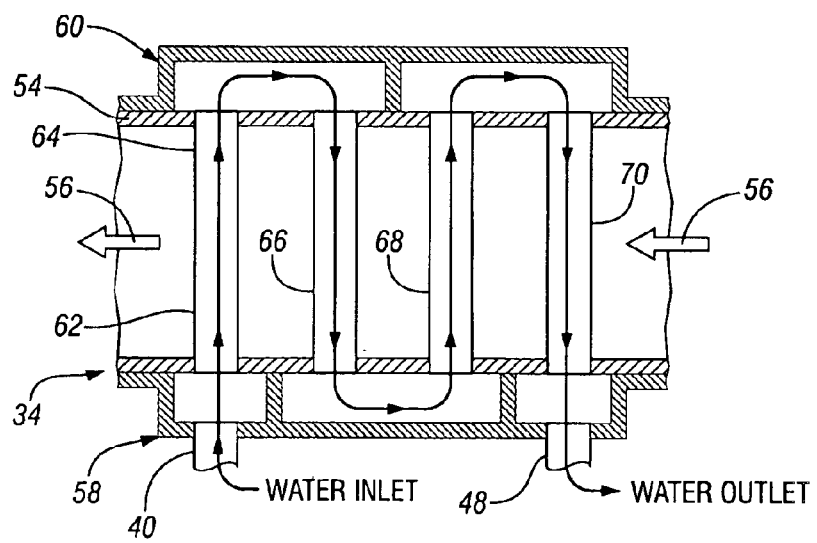
FIG. 6 is a schematic cross-sectional view of a four pass counterflow aftercooler according to the invention.

Referring now to FIG. 6 of the drawings, there is shown schematically an operational view of the interior of one of the aftercoolers 34. Each aftercooler includes a core 54, which is open at opposite ends for the passage of air flow in the direction of the arrows 56. In the new aftercooler core 54, the fin-tube fin density has been increased from 11 to 16 fins per inch to provide more efficient cooling of the air passing through the core.

On the sides of the core are provided a main header 58 and a return header 60. The headers 58, 60 are arranged to divide the water tubes 62 of the core into four groups which provide first, second, third and fourth passes 64, 66, 68 and 70 for water flow through the core from the inlet port 40 to the outlet port 48. The main header is provided with dual inlet ports 40 and dual outlet ports 48 so that the aftercooler may be installed on either side of the engine.

The arrangement defines a four pass counterflow aftercooler wherein air flow passing through the core first contacts the last pass 70, which has the warmest water, and then contacts sequentially passes 68 and 66, passing last through the first pass 64 which carries the coolest water. With this arrangement, maximum cooling of the charging air for the engine cylinders is obtained since the charging air is last in cooling communication with the first pass of the aftercooler which carries the coolest water.

For non-turbocharged engines, some of the SW kits only require new injectors. The 645E kits additionally require new oil separator elements as well as new injectors. The remaining kits for turbocharged engines all include new injectors and the new four pass counterflow aftercoolers 34, previously described, as well as new counterflow pipes 36, 38, 44, 46 for connecting the aftercoolers into the engine cooling system. A special fuel package for the E3B engines includes higher output injectors and new pistons which increase the engine cylinder compression ratio to about 16 to 1 from the 14 to 1 compression ratio of the original engines.

In operation of the 645 engines modified by their respective kits, the injection timing is retarded by an average of about 4–6 degrees of crankshaft rotation which reduces the formation of NOx in the engine cylinders. The high injection pressure and better atomization of the fuel provided by the new injectors avoids increasing of smoke, CO emissions and particulates in the combustion process. The counterflow arrangement and increased fin density of the four pass aftercoolers results in a reduction of airbox temperatures of about 20% with the resulting lowering of NOx emissions by about 7% compared to the original aftercoolers.

The aftercoolers are sized to fit into the same space occupied by the original two pass aftercoolers and the fuel injectors are designed to fit into the same space occupied by the original unit injectors. Further the injector design is such that setting of injector timing by the engine mechanic can be done with exactly the same tools and settings utilized with the original injectors so that no confusion arises as to the setting of the injector timing with the new injectors. Internal features of the injectors include reduced needle valve weight, smaller fuel volume between the needle valve and the internal plunger and reduced sac volume below the needle as compared to the original injectors. These features all assist in providing the improved combustion and reduced emissions which the injectors assist in providing.

The replacement pipes for connecting the aftercoolers with the engine are designed to be easily assembled into the engine with the aftercoolers themselves. The replacement pistons utilized in the special fuel package for E3B engines provides a compression ratio increase which provides better fuel efficiency for the engines involved. The piston crown configurations are designed to match the injector characteristics so as to provide a maximum of operating efficiency and power production.

The selection, development and evaluation of the new engine components including the improved fuel injectors and their respective timing settings for each of the particular engine models for which an emission kit was designed, together with the four pass counterflow aftercoolers, have provided the ability to operate at reduced NOx levels without sacrificing engine performance or creating additional smoke, CO or particulate emissions. Development of these kits for engine modification was accomplished over an extended time period requiring many tests to determine the ideal injection timing for each engine model. The results of these tests then determined the proper injector construction features and the characteristics of the aftercoolers that form major features of the kits.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A kit for reduction of exhaust emissions from EMD 645 two cycle diesel engines having two banks of cylinders and an aftercooler mount connecting with an airbox for each cylinder bank, the kit comprising in combination:

a high injection efficiency unit fuel injector for each cylinder of the engine, the injector providing retarded specific fuel injection timing and increased injection pressure with resulting improved fuel atomization; and a four pass counterflow water to air aftercooler for each bank of cylinders providing reduced airbox temperatures;

the combination when installed providing reduced NOx emissions.

2. A kit as in claim 1 wherein the fuel injectors provide increased injection pressure and improved fuel atomization which permits retarding injection timing without adversely affecting engine performance and smoke.

3. A kit as in claim 2 wherein the injectors provide the specified timing retard without changing the original injector timing settings.

4. A kit as in claim 2 wherein the injectors include reduced needle valve weight, smaller fuel volume between the needle valve and plunger, and reduced sac volume as compared to the original injectors.

5. A kit as in claim 1 wherein the aftercoolers are effective to lower airbox temperatures by approximately 20% and NOx emissions by about 7% compared to the original aftercoolers.

6. A kit as in claim 1 wherein the aftercoolers are mountable in the same space occupied by the original aftercoolers.

7. A kit as in claim 1 including replacement piping for connecting the aftercoolers with the engine cooling system.

8. A kit as in claim 1 including replacement pistons increasing the cylinder compression ratio from about 14.5/1 to about 16/1 for improving fuel efficiency.

* * * * *